United States Patent
Hamilton et al.

[11] Patent Number: 5,616,200
[45] Date of Patent: Apr. 1, 1997

[54] I-BOND METHOD FOR MAKING FUSION-BONDED CARPET

[75] Inventors: Wayne M. Hamilton, La Grange; David K. Slosberg, Atlanta, both of Ga.

[73] Assignee: Interface, Inc., LaGrange, Ga.

[21] Appl. No.: 154,611

[22] Filed: Nov. 17, 1993

Related U.S. Application Data

[63] Continuation-in-part of Ser. No. 965,874, Oct. 23, 1992, abandoned.

[51] Int. Cl.⁶ .............................. B32B 31/12; D04H 11/00
[52] U.S. Cl. .............................................. 156/72; 156/254
[58] Field of Search ........................... 156/72, 254, 270; 428/89, 92, 93, 94, 95, 97, 377; 57/210, 211, 230, 231, 243, 244; 28/160

[56] References Cited

U.S. PATENT DOCUMENTS

| | | | |
|---|---|---|---|
| 1,563,307 | 11/1925 | Frank | 57/210 |
| 1,679,553 | 8/1928 | Waite | 57/210 |
| 1,803,021 | 4/1931 | Koella | 57/210 |
| 2,495,666 | 1/1950 | Taubert | 156/72 |
| 3,013,325 | 12/1961 | McNally et al. | 28/160 |
| 3,278,363 | 10/1966 | Couquet | 156/72 |
| 3,843,432 | 10/1974 | Wethington | 156/72 |
| 3,847,692 | 11/1974 | Bondi | 156/72 |
| 3,866,499 | 2/1975 | Messner | 83/278 |
| 4,668,553 | 5/1987 | Scott et al. | 156/72 |

FOREIGN PATENT DOCUMENTS

| | | | |
|---|---|---|---|
| 2304578 | 8/1974 | Germany | 57/210 |
| 3126051 | 1/1983 | Germany | 57/244 |
| 300340 | 12/1990 | Japan | 57/210 |
| WO90/00967 | 2/1990 | WIPO | 156/72 |

*Primary Examiner*—Steven D. Maki
*Attorney, Agent, or Firm*—Richard P. Crowley

[57] ABSTRACT

A fusion-bonded carpet system and method of manufacture which method includes providing as all or a portion of the wear face surface cut yarn material in rope form prepared in rope bundles and implanting one or both ends of the rope bundle in an adhesive layer on a backing sheet to provide one or two I-bond, fusion-bonded carpet material having a selected pattern on the wear face surface. The fusion-bonded carpet has a wear face surface composed of all or part of a yarn material in rope bundle form, for example, of a multicolored random or selected pattern. The carpet material may have a backing layer and form carpet tile.

23 Claims, 3 Drawing Sheets

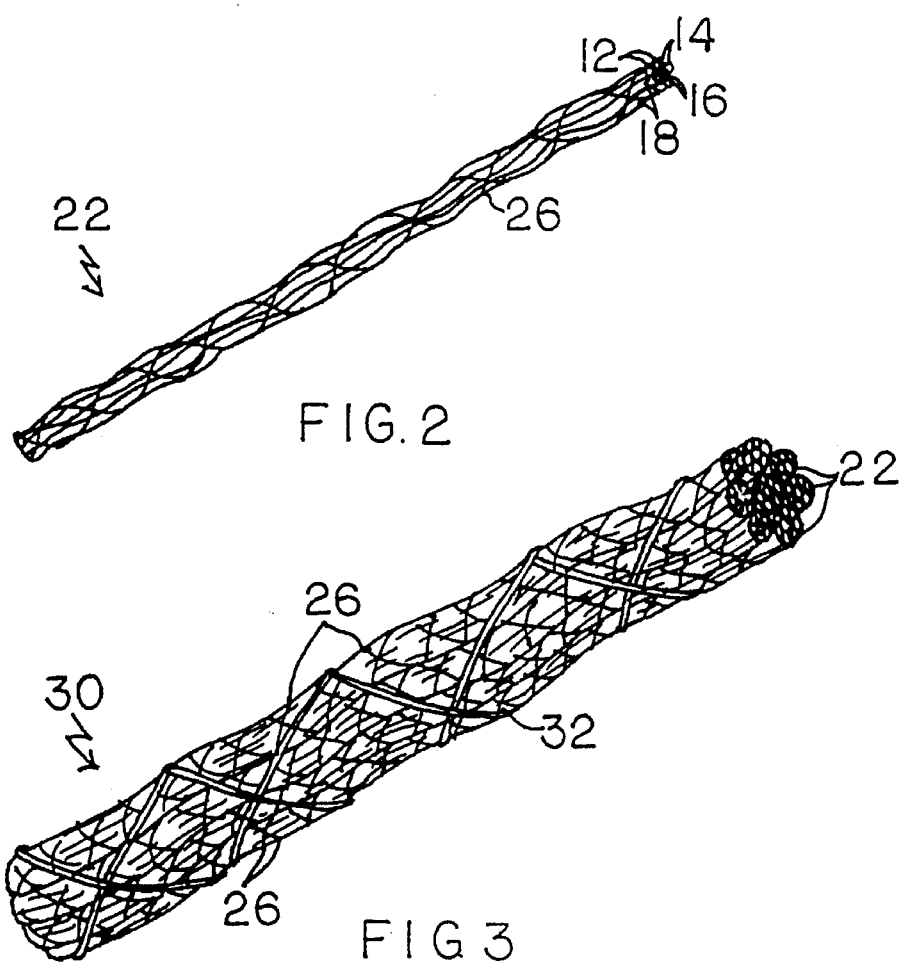
FIG. 2
FIG. 3
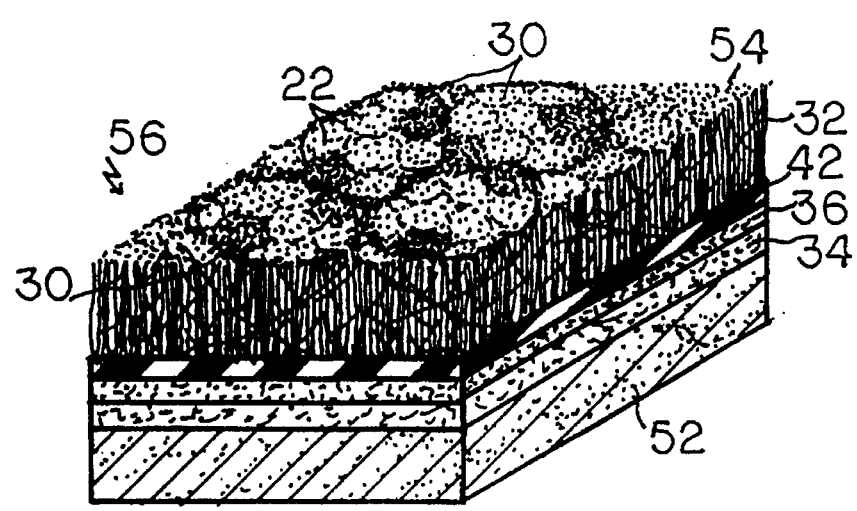
FIG. 4

I-BOND METHOD FOR MAKING FUSION-BONDED CARPET

REFERENCE TO PRIOR APPLICATIONS

This a continuation-in-part of application Ser. No. 07/965,874 filed on Oct. 23, 1992 now abandoned.

BACKGROUND OF THE INVENTION

Carpets, such as free-lay carpet or backed carpet tile, have been prepared as either a tufted or a fusion-bonded carpet material having a wear face surface.

Tufted carpet tile generally comprises a primary carpet base sheet material having a plurality of tufted yarns through the primary base sheet material to form a wear face surface of loop or cut pile, and usually with a precoat, such as of a latex-type material, like carboxylated styrene-butadiene-styrene precoat, on the back surface to bond the yarn to the primary back. Tufted carpet roll goods usually have a secondary backing of jute, woven polypropylene or foam. Tufted carpet tile includes a backing layer which generally comprises a solid, thermoplastic material, such as atactic polypropylene, bitumen or polyvinyl chloride, preferably with a glass fiber sheet material, such as a mesh or fleece material, embedded therein to impart dimensional stability to the carpet tile. The backing may also include a foam-type backing layer, such as a PVC or urethane foam layer. Non-thermoplastic materials, such as polyurethane, may also be used for the backing. In addition, the tufted carpet tile may include a secondary backing sheet, such as of fiberglass, polypropylene or polyester-type material, or in fact, may be laminated and/or contain a pressure-sensitive, adhesive, strippable layer for application to a substrate.

Fusion-bonded carpet has essentially the same backing except that the fusion-bonded carpet is characterized by a plurality of cut pile yarns, for example, of nylon or other natural or synthetic fibrous-type material, implanted in an adhesive layer, particularly a thermoplastic, like a polyvinyl chloride layer, or a hot-melt adhesive layer. Where a polyvinyl chloride plastisol is used, heating of the layer gels and then fuses the layer into solid form, while with hot-melt adhesive material, a melted layer is applied and subsequently cooled into solid form. The plurality of fibrous yarns are bonded to and extend upright from the adhesive base layer to form a face wear surface. Generally, a fusion-bonded carpet also includes an adjacent backing layer of a glass fiber scrim material having large open areas and a glass fiber fleece which serves as a stabilizing carrier.

Fusion-bonded carpets may be prepared employing a number of well-known, but different techniques and machines in both horizontal and vertical processes known as the I-bond or U-bond processes. The single-end fiber implantation technique, known as the I-bond process, holds the ends of the severed yarns in place by a layer of an adhesive material on a backing material, for example, a fiberglass scrim-type material adjacent to a non-woven, glass fiber fleece layer. Thereafter, the free ends of the fusion-bonded carpet may be embedded in another adhesive layer as before on the same or different backing material, and the resulting sandwich-type carpet then cut, for example, with an oscillating blade in a vertical fusion-bonding method or by a continuing band knife in the horizontal fusion-bonding method, to form two rolls of fusion-bonded carpet having a cut wear face surface for backing into carpet tile or used as roll goods. In another I-bond process, the severed yarn has one end implanted directly into an adhesive layer on a backing sheet, with the other severed end forming the wear face surface of the carpet.

The U-bond process generally includes a corrugated or pleated layer of yarn, wherein each loop end is placed in a layer of adhesive material on backing sheet material, and then the sandwich-formed carpet material cut to form two rolls of fusion-bonded carpet, each roll having cut loops of yarn embedded in the adhesive layer; hence, the name U-bond process.

The fusion-bonded carpet material prepared by these various processes can then be used as free-lay carpet or be converted into carpet or carpet tile with the application of a suitable backing layer and cutting or trimming it into suitable form.

It is desirable to provide for a new and improved fusion-bonded carpet material prepared by a modified I-bond process, including a carpet tile characterized by novel design patterns on the face wear surface and for a method for preparing such carpet material.

SUMMARY OF THE INVENTION

The invention relates to a method and system for the manufacture of fusion-bonded floor covering, such as carpet tile, and particularly to an I-bond, fusion-bonded carpet tile, having a multicolored pattern on the face wear surface thereon.

The present invention is directed to a fusion-bonded carpet, and more particularly an I-bond fusion-bonded carpet, and to a method of preparing the fusion-bonded carpet, particularly a carpet tile which fusion-bonded carpet and method provide for a repeatable or random pattern in the face wear surface, particularly a multicolored repeatable or random pattern of selected design.

The method comprises coating a layer of an adhesive material onto a sheet backing material, feeding the yarn material to a clamping means, cutting the yarn material to a defined height, implanting cut yarn material into an adhesive coated layer in a plane generally perpendicular to the backing material and bonding the implanted yarn material into the adhesive coated layer.

The improvement comprises preparing multiple strands of the yarn material in rope form, forming selected bundles of the rope-formed yarn material with the yarn material composed of yarn of different characteristics, such as being of different colors in the strands of the rope form, severing the rope-formed bundles and implanting one end of the severed rope bundles in the adhesive layer to form a pattern of the ends of the rope bundles as the face wear surface of the carpet material. Optionally, and preferably, the other end of the severed rope bundles are implanted in an adhesive layer on a backing sheet to form a sandwich-type construction and then severing the implanted yarn material generally intermediate the sandwich to form two separate rolls of carpet material. Optionally, the carpet material may then have a backing applied thereto and cut when carpet tile is being prepared.

The fusion-bonded carpet of the invention comprises a carpet having a face wear surface which is formed in whole or in part by the display of the end view of the yarn material paced in strands in rope-like forms and bundles, the bundles bonded onto an adhesive layer material on a backing sheet, the severed ends of the rope-formed bundles forming the face wear surface of the carpet material.

The invention comprises a system for the manufacture of a fusion-bonded carpet, which system comprises a source of multiple strands of yarn material, the yarn material selected to have different characteristics; rope making means to receive the multiple strands of yarn material from the source and to form the multiple strands in rope form, which rope form includes means to maintain the integrity of the rope form during subsequent processing; means to include a plurality of the rope forms from the rope making means into rope form bundles, and includes means to maintain the integrity of the rope form bundles during subsequent processing; means to sever the rope form bundles to a selected height and to form cut rope form bundles having a one and other end; means to implant the one end of the cut rope form bundle into an adhesive coating layer on a backing sheet material; and means to secure the implanted cut rope form bundles to the adhesive coating layer to form a fusion-bonded carpet having a face wear surface.

The system for the manufacture of a fusion-bonded carpet comprises a plurality of strands of yarn material arranged in a generally parallel, untwisted, rope form and a means to maintain the integrity of the strands of yarn material in the rope form for subsequent processing.

The invention further comprises a yarn rope form bundle adapted for use in the manufacture of a fusion-bonded carpet, which rope form bundle material comprises a plurality of rope form materials composed of a plurality of strands of yarn material in rope form and having means to maintain the integrity of the rope form material; the rope form materials bundled together adjacent each other to form a rope form bundle; means to maintain the integrity of the rope form bundle during processing to form a fusion-bonded carpet; and means wherein the yarn material of one or more of the rope form materials have selected different characteristics, the yarn material adapted to form a selected design pattern on the face surface of a fusion-bonded carpet.

The invention permits the creation of a selected repeatable or random pattern in an I-bond, fusion-bonded carpet, particularly of a multicolored pattern as the face wear surface of the carpet by employing yarn material in strand form with the strands making up a selected rope form and the ropes bundled together. The rope-like bundles may be sliced to desired yarn height and implanted at one end in the adhesive layer to display the other end view of the selected ropes in the rope bundle, or preferably both ends implanted and then cut to form two separate rolls of carpet material with the selected yarn face wear surface. The method and the resulting carpet material provides for easily ready flexibility in the selection repeatable or random patterns to make up the face wear surface of I-bond, fusion-bonded carpet.

In the present techniques of preparing I-bond, fusion-bonded carpet, individual yarns are fed from beams to a clamping beam wherein the yarns are accumulated to a desired thickness determined by the size and number of the individual yarns, and the clamped yarns are sheared by a guillotine blade and implanted into an adhesive coating layer on a backing sheet. The other end of the yarn is then implanted in an opposite adhesive layer on a backing sheet, and then the sandwich is cut to form two rolls of carpet material. If varied yarn colors are employed, straight lines or patterns would be formed employing this prior art system. Space-dyed yarns can be used to promote the highlights on the face wear surface, but the size of contrast color insert is quite limited in the present I-bond, fusion-bonded carpet methods.

In the invention, yarn materials are prepared in strands of predetermined yarns and then formed into a rope form, and the rope form prepared in predetermined multiple rope form bundles. The strands making up the rope-like form and the rope-end bundles are held together to maintain strand, rope-like and bundle integrity. The yarn material may be produced in multiple selected strands to make up in rope form, then selected rope formed together to make up selected rope bundles which are to be held, clamped and implanted in the adhesive layer, as in a typical I-bond, fusion-bonded carpet method.

The invention comprises a modification to the conventional I-bond methods of preparing carpet material, and particularly for carpet tile material, to form carpet material of varying yarn color or characteristics as the face wear surface. The sheet backing material employed in connection with the carpet material may comprise for example any woven, nonwoven, natural or synthetic sheet material, but particularly would include sheet material as employed in I-bond or in carpet manufacture to include, but not be limited to, natural materials, such as jute, synthetic materials, such as polyester, woven or non-woven sheet material, such as glass fiber scrim, and in particular, glass fiber, non-woven tissue material, which backing sheet materials may be used alone or in various combinations.

The adhesive material employed to form the adhesive coating layer and to retain the implanted yarn material in a generally upright and typically perpendicular position may comprise any type of adhesive-type material, to include but not be limited to, vinyl chloride resin material, such as a vinyl chloride resin plastisol, which may be applied as a liquid coating layer and subsequently on heating, gels and fuses to form a solid polyvinyl chloride layer or a hot-melt adhesive layer composed of a thermoplastic polymer material which on heating melts, and on cooling solidifies, such s for example atactic polypropylene, bitumen, modified bitumen, or other type material. Other polymers may include olefinic-vinyl acid ester, such as ethylene vinyl acetate, and copolymers, polyurethane, elastomeric material, styrene-butadiene material, SBS rubber, polyamides, polyurethane and various latex-type materials to include SBS rubber, carboxylated SIS rubber and ethylene vinyl acetate. The latex adhesive may include, but not be limited to, various vinyl lattices such as acrylic-vinyl, copolymer and olefin-vinyl esters, such as ethylene vinyl short-chain esters, like ethylene vinyl acetate. The adhesive composition may be compounded with other components, fillers and additives.

The yarn material employed may comprise any fibrous-type material, natural or synthetic, and combinations thereof, but more typically comprises nylon, polyester or olefinic-type resin, or natural products such as wool and combinations thereof, and such fibrous-type materials as used in preparing carpet material, particularly carpet tile material. The carpet material so prepared may be employed as a free-lay carpet on top of a separate solid or foam or other type of carpet support or may have a separate backing attached thereto. Carpet tile material may include a solid or foam material secured to the back surface of the backing sheet, alone or with a secondary backing sheet. Thus, the carpet material may be employed as a free-lay carpet, or more particularly, may be further coated, such as with a vinyl chloride resin, atactic polypropylene or bitumen or foam material, then cut to form carpet tile. The carpet tile material may be freely laid or may also include pressure-sensitive adhesives on the secondary backing or back surface.

For purposes of illustration only the method will be described with the double implantation I-bond method wherein each end of the rope bundles are immersed in a molten or liquid adhesive layer on a backing sheet to form an I-bond fusion-bonded carpet. In the double implantation method as used, both ends of the rope end bundles are employed and placed in an adhesive layer to form a sandwich and then the yarn material severed to form two separate carpet rolls. The selection of materials employed in the method may vary as desired and to provide compatibility. For example, where a vinyl plastisol is employed as the adhesive coating layer, the carpet tile backing layer would employ a vinyl chloride compatible material, such as a polyvinyl chloride solid backing layer. If the adhesive material comprises a SIS or carboxylated SIS adhesive coating layer, then the carpet tile backing material would comprise a compatible backing layer of a bitumen or polymer-modified bitumen layer to form the carpet tile material.

The yarn material is selected for a selected, designed face wear surface, for example, the yarn material strands thereof or the rope which is made up of the strands or the end rope bundles made up of the rope, may vary. The yarn material is selected to provide for the desired characteristics, such as, for example, the yarn material, strands or rope so formed from these strands may be formed of multicolored or separate colors, and then blended in the end rope bundles to form a random or repeatable pattern as desired as the face wear surface of the carpet. For example, the yarn material employed in either the strands, rope or bundles can vary in a number of different characteristics to include a multiple texture, random or repeatable pattern on the carpet tile created by varying for example the yarn sizes, the yarn plies, the twist level, the yarn twist direction, the yarn heat setting, the yarn color and other fibrous yarn material characteristics. Thus, the method and the resulting carpet material provide for a wide variety of textures and patterns on the face surface, including varying the yarn material, such as blending yarn material of various yarn sizes, colors and plies to arrive at a desired pattern. The multiple end rope bundles of the yarn materials used in conjunction with the method may be made as the major part or all of the face wear surface of the carpet material. They can also be used in conjunction with single end yarns of selected characteristics, for example, to fill in the voids or to modify any desired pattern on the face wear surface of the carpet. The single yarn material may represent a major or minor component of face surface of the carpet. The method is directed to providing a repeatable, selected pattern on the face wear surface. However, random patterns are also possible by just varying the input and location of the multiple bundles.

In the invention, yarn material is formed into various and multiple strands, for example, strands of two to twenty groups of yarn material of the same or different colors or characteristics. The strands are then fed into a ropemaking machine or may be formed within the ropemaking machine to form a rope material composed for example of four to twelve, for example, six to ten strands. The rope material so emerging may be bundled together to form rope bundles which are to be severed and employed in the invention.

The yarn strand may be composed of yarn of the same material or multicolored material. A rope is then made of various intertwined, woven or twisted or straight strands, either single or multicolored, then the ropes placed together in four to twelve or more, for example, six to ten or more, rope bundles to form the rope bundles to be clamped, severed and implanted in the adhesive coating.

It has been found that twisting of the strands in the rope tends to place the fibers at an angle to the base material, while untwisted rope and rope bundles made of untwisted rope with the yarn strands generally parallel permits the fibers to remain generally upright and erect from the sheet base or backing material. Therefore, in one preferred embodiment, desirable results are achieved by employing rope and rope bundles composed of straight and parallel yarn material. The straight, parallel rope and rope bundles are maintained by wrapping the exterior surface of either with preferably a yarn material or a braided wrap to insure rope and rope bundle integrity. Any ropemaking machine may be employed into which the yarns are fed to form a rope material. One ropemaking machine comprises a ropemaking machine designed to make smaller diameter ropes ranging from about 3 mm in diameter to 13 mm in diameter (rope 501) which is manufactured and sold by Zima S.p.a. of Italy. Such ropemaking machines, such as Rope Layer 501, a Zima compound ropemaking machine, employs a plurality of yarn strand spools, then the machine with the run of the strands and the rope produced has 4-inch for 1-inch twist on the strands and 2-inch for 1-inch twist on the rope. The rope produced by the ropemaking machine may be used directly in the I-bond method.

Optionally, the strands of the yarn material making up the rope as well as the rope bundles are retained together for the purposes of rope and rope bundle integrity during the carpet manufacturing method. The rope and the rope bundles may be retained together by a variety of means including an adhesive means, either temporarily or permanently arranged, or bonded or more particularly, retained together by a yarn material, such as mono- or multifilament spun wrapped spirally around the ropes and then around the rope bundle so that the ropes and the rope bundle material may be effectively moved into the clamping means and guillotine blade of the I-bond machinery. The means to retain the rope and rope bundles together may also include a heat-shrinkable filament or film wrap material or any other means to retain the rope and the rope bundles together without adversely effecting the employment of the strand or rope and rope end bundles as yarn material in the I-bond, fusion-bonded process. The carpet may be made of single yarns, rope or rope end bundles together as desired to make up the face wear surface of the carpet material. Typically, the retaining means employed in the rope and the rope end bundles are, particularly where it is a monofilament or multifilament type material loosely wrapped around the external surface of the rope and rope bundled materials, are left in place after the clamping, cutting and implantation of the rope and rope end bundles as they do not adversely effect the face wear surface of the resulting carpet material.

The employment of rope and rope bundles of yarn materials in use in the invention is restricted to I-bond methods of manufacture. The employment of the U-bond method for providing fusion-bonded carpets does not permit the adhesive layer to penetrate the rope or rope end bundles sufficiently.

The invention will be described and illustrated in connection with certain illustrated embodiments; however, it is recognized that various modifications, changes, improvements and additions to the illustrated embodiments may be made by those persons skilled in the art, all falling within the spirit and scope of the invention.

BRIEF DESCRIPTION OF THE DRAWINGS

FIG. 2 is a fragmentary, perspective view from above of a plurality of strands of yarn material in rope form.

FIG. 3 is a fragmentary, perspective view from above of a plurality of rope yarn material in rope bundle form for use in an I-bond, fusion-bonding method.

FIG. 4 is a large sectional, perspective view from above of a carpet tile prepared by the method of the invention.

DESCRIPTION OF THE EMBODIMENTS

Figure 1:
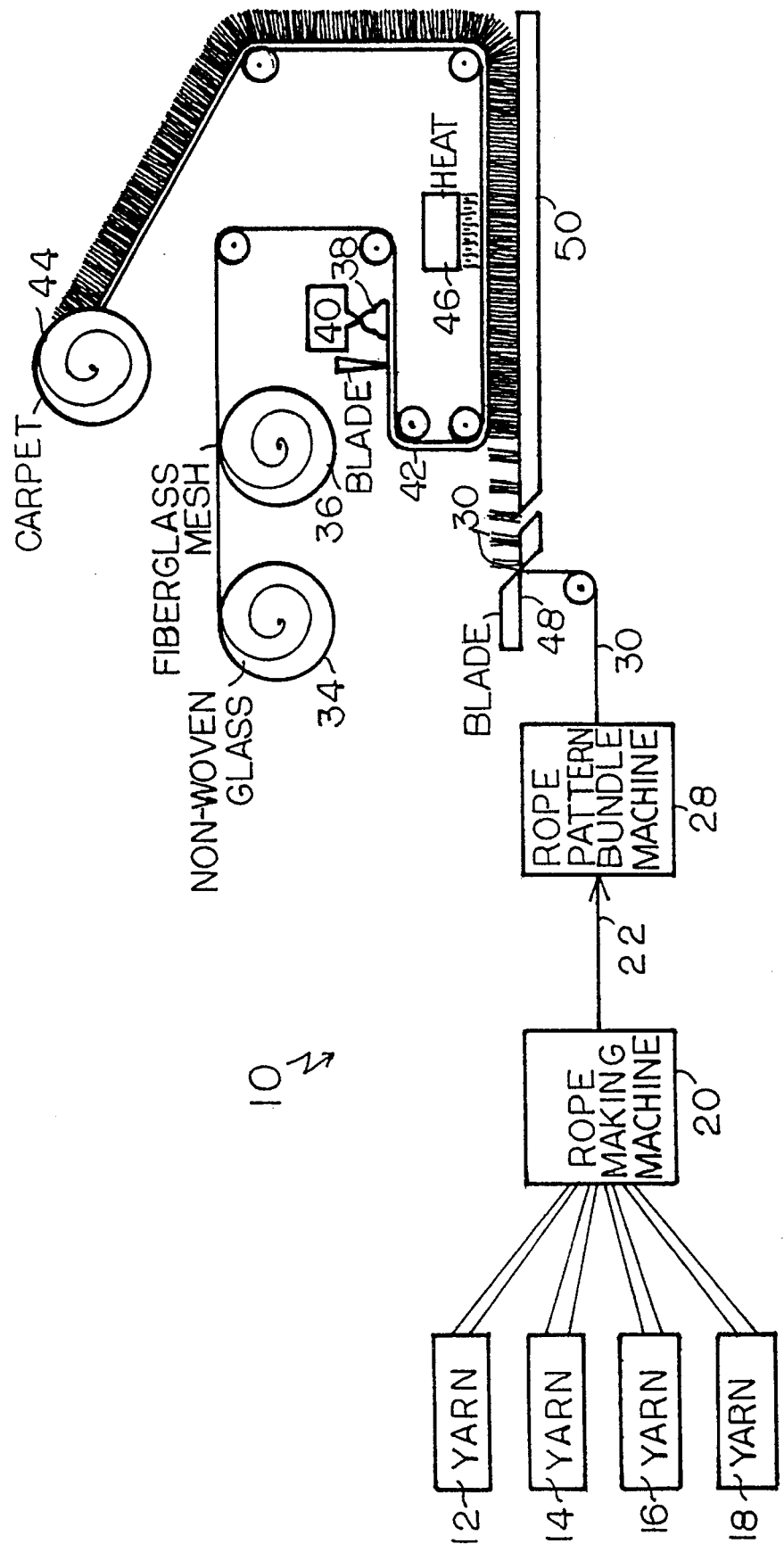
FIG. 1 is a schematic illustration of the method of the invention.

FIG. 1 is a schematic illustration of a method of forming an I-bond, fusion-bonded carpet material of the invention, which method 10 employs a plurality of yarn sources 12, 14, 16 and 18 to feed separate strands of yarn into a ropemaking machine 20 as illustrated with eight strands of yarn entering the ropemaking machine and providing the strands in rope form 22 (see FIG. 2), the stands of yarn are held together for the purposes of integrity by spirally winding of a monofilament 26, such as nylon; about the exterior surface along the length of the rope 22. Rope 22 is then placed in a rope pattern bundling machine 28 whereby the rope 22 made up of various yarn strands is then formed into rope bundles 30 (see FIG. 3) in which the ropes within the bundle are maintained in the rope bundle integrity by the employment also of a monofilament nylon 32 spirally wrapped around the exterior surface of the rope bundle 30. The rope bundle 30 is then connected to a clamping guillotine blade 48 wherein the rope bundle 30 is cut to a predetermined selected height, for example, about 3 mm to 12 mm, with each rope bundle 30 having eight strands and with the yarn material making up the strands, for example, composed of nylon with one, two, three or more ropes 22 of different color than the other rope making up a rope bundle 30 to provide a desired random or repeatable pattern on the face surface of the resulting carpet.

The I-bond, fusion-bonded carpet is first prepared through a typical technique of employing a non-woven, glass fiber tissue sheet material 34 together with a fiberglass mesh material 36 to form the backing sheet of the resulting carpet 44. A polyvinyl resin plastisol 38 dispensed from a trough 40 to form a thin, liquid, adhesive coating layer 42 which penetrates the open fiber glass mesh material 34, but does not penetrate the non-woven glass fiber sheet 34. The coating layer 42 may vary in thicknesses but typically ranges from about 2 mm to 10 mm, for example, 2 mm to 6 mm. One end of the severed rope bundle ends is then inserted into the liquid plastisol layer 42 and the back surface of the backing sheet then heated, such as through a hot air oven or infrared heat 46 to gel and then fuse the plastisol layer so as to retain the end of the rope bundles in the layer 42. The rope end bundles 30 are supported and moved on a conveyor belt 50, and the resulting carpet 44 then rolled up and may be used as a free-lay carpet with a separate independent backing or may be coated with a separate backing and then cut to form carpet tile.

FIG. 2 shows a rope 22 produced by the ropemaking machine 20 and composed of a plurality of yarn strands of a continuous nylon fiber in which the fiber has been selected to have desired characteristics, for example, of one particular color and with the strands of yarn material maintained in the rope form by an exterior monofilament of wrapped nylon fiber 26.

FIG. 3 is a perspective of the rope bundles 30 showing selected ropes 22 of FIG. 2 in a bundled configuration and with the bundle integrity maintained during the bonding process through the employment of an exterior monofilament, like nylon wrapping, 32. One or more the ropes 22 within the bundle 30 is of one color and the remaining ropes 22 are a different color or a variety of colors or may have different fiber characteristics to provide the desired pattern on the face surface of the carpet 44.

FIG. 4 is an enlarged, sectional, perspective view from above of a carpet tile 56 prepared by the method of the invention which has polyvinyl chloride solid backing layer 52 which has been applied to the back surface of the non-woven fiberglass tissue sheet material 34. As particularly illustrated on the face surface, there is shown a surface composed of rope end bundles 30 which are composed of ropes 22 wherein the security binders 32 and 26 are retained in place and wherein as illustrated some of the rope bundles 22 are of a different color than others in the same rope or in the same rope bundle to provide a desired pattern. Also, single fibers 54 have been implanted in a typical, regular I-bond process to fill in the voids and to provide a desired different pattern in combination with the rope end bundles 30.

Figure 5:
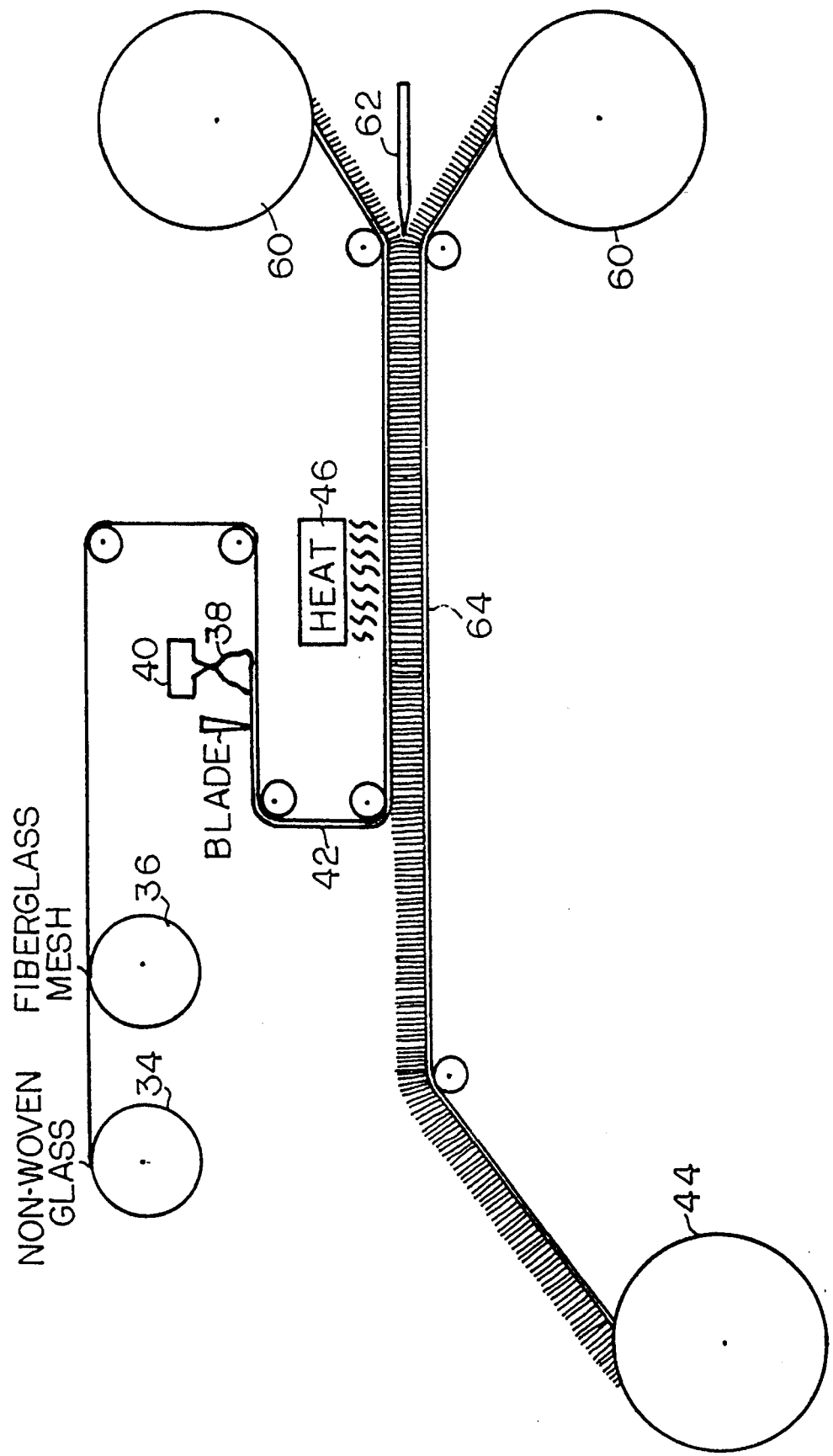
FIG. 5 is a schematic illustration of the optional final step in the dual implantation method of the invention.

FIG. 5 is a schematic illustration of the I-bond double implantation method of the invention wherein the I-bond fusion-bonded carpet material 44 is employed with the other end of the rope end bundles 30 implanted in the layer 42, and in FIG. 1 are implanted in an opposite layer 42 heated to gel and fuse the layer to form an I-bond, fusion-bonded sandwich material 64 which is severed by an oscillating blade 62 and two separate rolls of carpet material 60 prepared. As illustrated, the backing layers and the adhesive layers on both sides are the same; however, the backing layer and/or adhesive layer may be different as required.

The invention as disclosed and illustrated provides for a unique I-bond, fusion-bonded carpet material, particularly carpet tile, wherein the face wear surface layer maybe composed of rope or rope end bundles wherein repeatable or random design patterns employing said rope or rope end bundles may be used.

What is claimed is:

1. In an I-bond method for the manufacture of a fusion-bonded carpet having a fibrous wear face surface composed of selected yarn materials, which method comprises:

a) coating a layer of adhesive material onto a backing sheet material;

b) clamping and cutting yarn material to a defined height, the yarn material having a one and the other end, the yarn material selected to form the wear face surface of the carpet; and c) implanting into the adhesive coating layer in a plane generally perpendicular to the backing sheet material, one end of the cut yarn material, and securing the cut and implanted yarn material in the adhesive coating layer to form a fusion-bonded carpet material having a wear face surface, wherein the improvement comprises:

i) forming rope forms, wherein each rope form comprises multiple strands composed of a plurality of yarn materials and wrapping a filament material about the exterior surface of each rope form to maintain its rope form integrity during subsequent clamping, cutting and implanting steps in the I-bond method of manufacturing of a fusion-bonded carpet;

ii) bundling a plurality of the rope forms together to form a plurality of rope form bundles wherein the yarn material of the rope forms or rope form bundles is yarn material having selected characteristics and wrapping a filament about the exterior surface of each rope form bundle;

iii) cutting the rope form bundles to form a plurality of cut rope form bundles having a one and the other end and having a selected height sufficient to form a fibrous wear face surface; and iv) implanting the one end of a plurality of the cut rope form bundles into the adhesive coating layer and securing the one end to the coating layer to provide a fusion-bonded carpet having a selected pattern on the wear face surface.

2. The method of claim 1 which includes selecting yarn material of different colors to provide for a multi-colored wear face surface of the fusion-bonded carpet.

3. The method of claim 1 which includes spirally wrapping a mono- or multi-filament about the exterior surface of the rope form and along the length thereof to maintain rope form integrity.

4. The method of claim 1 which includes forming untwisted rope forms wherein each rope form comprises generally straight and parallel yarn material.

5. The method of claim 1 which includes forming rope forms having a general diameter of from about 3 mm to 13 mm.

6. The method of claim 1 which includes implanting one and the other end of the plurality of rope form bundles into separate adhesive coated layers on separate backing sheet materials to form a sandwich fusion-bonded carpet material and thereafter severing the sandwich carpet material to form two separate fusion-bonded carpets, each having a wear face surface with a selected pattern.

7. The method of claim 1 wherein the yarn material of the rope form yarn material having selected characteristics selected from the group consisting of yarn size, yarn ply, yarn twist level, yarn twist direction, yarn color, yarn heat setting properties and combinations thereof.

8. The method of claim 1 which includes implanting single end yarn material in the adhesive coating layer to provide a carpet having a wear face surface composed of multiple rope bundles and single yarn material.

9. The method of claim 1 wherein each rope form comprises from about 2 to 20 strands of yarn material.

10. The method of claim 1 wherein each rope form bundle comprises from about 4 to 12 rope forms.

11. The method of claim 1 which includes securing a carpet backing layer to the backing sheet material and cutting the fusion-bonded carpet having the carpet backing layer secured thereto to form carpet tile.

12. The method of claim 11 which includes employing as the sheet backing material adjacent layers of a non-woven glass fiber sheet material and a fiberglass mesh sheet material.

13. The method of claim 1 wherein one of the rope forms in a rope bundle is of one color and other rope forms are of a different color.

14. The method of claim 1 wherein the adhesive coating layer is selected from the groups of adhesives consisting of a hot melt adhesive and polyvinyl chloride adhesive.

15. The method of claim 1 which includes twisting multiple strands of yarn material to form the rope-forms.

16. The method of claim 1 which includes feeding multiple strands of the yarn material into a rope making machine to form rope bundles.

17. The method of claim 16 which includes feeding a plurality of the rope bundles into a rope bundling machine to form rope bundles.

18. The method of claim 1 which includes cutting the plurality of rope bundles to a selected height of about 3 mm to 12 mm.

19. The method of claim 1 wherein the multiple strands of yarn material comprises strands of at least two different colors.

20. The method of claim 1 wherein one or more of the rope forms of a rope bundle has one color and one or more of the rope forms of the rope bundle have a different color.

21. The method of claim 1 which includes twisting the multiple strands of yarn material to form twisted rope forms and spirally wrapping a filament about the twisted rope form to maintain the integrity of the twisted rope form.

22. In an I-bond method for the manufacture of fusion-bonded carpet having a fibrous wear face surface composed of selected yarn materials, which method comprises:

a) coating a layer of adhesive material onto a backing sheet material;

b) clamping and cutting yarn material to a defined height, the yarn material having a one and the other end, the yarn material selected to form the wear face surface of the carpet; and c) implanting into the adhesive coating layer in a plane generally perpendicular to the sheet backing material, one end of the cut yarn material, and securing the cut and implanted yarn material in the adhesive coating layer to form a carpet material having a wear face surface, wherein the improvement comprises:

i) forming rope forms, wherein each rope form comprises multiple strands of generally parallel, untwisted, yarn material and each rope form is maintained in rope form integrity by the employment of filaments wrapped around the exterior surface of the rope form;

ii) bundling a plurality of the rope forms together to form a plurality of rope form bundles wherein the rope form bundles are maintained in rope form bundle integrity by employment of filaments wrapped around the exterior surface of the rope form bundles wherein the yarn material comprises yarn material having different colors;

iii) cutting the rope form bundles to form cut rope form bundles having a one and the other end and having a selected height; and iv) implanting the one end of the plurality of the cut rope form bundles into the adhesive coating layer to provide a fusion-bonded carpet having a selected multi-colored pattern on the wear face surface.

23. The method of claim 22 which includes applying a backing layer to the fusion-bonded carpet material and cutting the fusion-bonded carpet material with said backing layer into a carpet tile material.

* * * * *

UNITED STATES PATENT AND TRADEMARK OFFICE
CERTIFICATE OF CORRECTION

PATENT NO. : 5,616,200
DATED : April 1, 1997
INVENTOR(S) : Wayne M. Hamilton et al Page 1 of 2

It is certified that error appears in the above-indentified patent and that said Letters Patent is hereby corrected as shown below:

```
Column 9, Claim 7, line 29, after "form", insert --is--.

Column 9, Claim 14, line 53, delete "groups", and insert
                    --group--.

Column 9, Claim 16, line 59, delete "bundles" and insert
                    --forms--.

Column 10, Claim 17, line 2, delete "bundles" and insert
                    --forms--.

Column 10, Claim 19, line 8, delete "comprises" and insert
                    --comprise--.

Column 10, Claim 20, line 11, after "color" insert --,--.

Column 10, Claim 21, line 15, delete "form" and insert
                    --forms--.
```

UNITED STATES PATENT AND TRADEMARK OFFICE
CERTIFICATE OF CORRECTION

PATENT NO.   : 5,616,200

DATED        : April 1, 1997

INVENTOR(S)  : Wayne M. Hamilton, et al

It is certified that error appears in the above-identified patent and that said Letters Patent is hereby corrected as shown below:

Column 10, Claim 21, line 16, delete "form" and insert -- forms --.

Signed and Sealed this

Third Day of March, 1998

*Attest:*

BRUCE LEHMAN

*Attesting Officer*      *Commissioner of Patents and Trademarks*